United States Patent

Quarendon

[19]

[11] Patent Number: 6,081,269
[45] Date of Patent: Jun. 27, 2000

[54] IMAGE PROCESSING SYSTEM AND METHOD FOR GENERATING DATA REPRESENTING A NUMBER OF POINTS IN A THREE-DIMENSIONAL SPACE FROM A PLURALITY OF TWO-DIMENSIONAL IMAGES OF THE SPACE

[75] Inventor: Peter Quarendon, Romsey, United Kingdom

[73] Assignee: International Business Machines Corporation, Armonk, N.Y.

[21] Appl. No.: 08/479,893

[22] Filed: Jun. 7, 1995

Related U.S. Application Data

[63] Continuation of application No. 08/030,509, Mar. 12, 1993, abandoned.

[30] Foreign Application Priority Data

Mar. 12, 1992 [EP] European Pat. Off. .............. 92302132

[51] Int. Cl.[7] .................................................. G06T 15/20
[52] U.S. Cl. ............................................................ 345/419
[58] Field of Search .................................. 395/119, 125, 395/130, 140, 120; 364/413.18, 413.17, 575; 382/196, 228, 302, 285, 294; 345/139

[56] References Cited

U.S. PATENT DOCUMENTS

| | | | |
|---|---|---|---|
| 4,586,038 | 4/1986 | Sims et al. ............................... | 345/430 |
| 4,835,532 | 5/1989 | Fant ......................................... | 345/136 |
| 4,855,934 | 8/1989 | Robinson ................................. | 345/430 |
| 4,894,776 | 1/1990 | Dekel ....................................... | 382/131 |
| 4,916,745 | 4/1990 | Hart et al. ................................ | 382/275 |
| 5,016,173 | 5/1991 | Kenet et al. ............................. | 382/128 |
| 5,119,444 | 6/1992 | Nishihara ................................. | 382/263 |
| 5,179,638 | 1/1993 | Dawson et al. ......................... | 345/425 |
| 5,187,754 | 2/1993 | Currin et al. ............................ | 382/284 |
| 5,224,208 | 6/1993 | Miller, Jr. et al. ....................... | 345/425 |
| 5,261,028 | 11/1993 | Ueda ....................................... | 345/419 |
| 5,297,215 | 3/1994 | Yamagushi .............................. | 382/131 |
| 5,384,580 | 1/1995 | Kadota ................................ | 345/419 X |
| 5,384,861 | 1/1995 | Mattson et al. ......................... | 382/131 |
| 5,386,829 | 2/1995 | Diamond ................................. | 600/425 |
| 5,390,291 | 2/1995 | Ohashi ..................................... | 345/441 |
| 5,392,367 | 2/1995 | Hsu et al. ................................ | 382/228 |
| 5,394,516 | 2/1995 | Winser ..................................... | 345/419 |
| 5,408,596 | 4/1995 | Nonaka et al. .......................... | 345/440 |
| 5,412,764 | 5/1995 | Tanaka .................................... | 345/424 |
| 5,432,712 | 7/1995 | Chan ....................................... | 382/191 |
| 5,455,896 | 10/1995 | Takamura ............................... | 345/419 |

OTHER PUBLICATIONS

Liu et al., 3D Curved Object Recognition fromMultiple 2D Camera Views, Computer Vision, Graphics and Image Processing, May 1990, v. 50, n. 2, pp. 177–187.

Margalit et al., Using Probabilistic DomainKnowledge to Reduce the Expected Computational Cost of Template Matching,Computer Vision, Graphics and Image Processing, Sep. 1990, v. 51, n. 3, pp. 219–234.

(List continued on next page.)

*Primary Examiner*—Anton W. Fetting
*Attorney, Agent, or Firm*—Mark S. Walker

[57] ABSTRACT

An image processing method is disclosed for generating 3-D graphical model data representing the appearance of a number of points in a 3-D region from two or more 2-D images of the region, the method comprising the steps of a) calculating, for each point, at least one variance value representing the variation, between different ones of the 2-D images in the region of the position on the 2-D images at which the point would appear if it were visible in the images; b) calculating, for each point and using a predetermined rule, a merit value from the variance values, the merit value representing the probability that, if the point lay on a visible surface in the 3-D region, the calculated variance values would be obtained; and c) assigning appearance data to each point in accordance with the merit values and the appearances of the positions on the 2-D images where the point would appear if it were visible thereon. The model is to be rendered to produce images for graphics applications.

19 Claims, 1 Drawing Sheet

OTHER PUBLICATIONS

Margalit et al., Note to Using Probabilistic DomainKnowledge to Reduce the Expected Computational Cost of Template Matching,Computer Vision, Graphics and Image Processing, Oct. 1990, v. 52, n. 1, pp. 110–123.

Salzman, A Method of General Moments for Orienting 2D Projections of Unknown 3D Objects,Computer Vision, Graphics and Image Processing, May 1990, v. 50, n. 2, pp. 129–156.

Lee et al., Finding Point Correspondences and Determining Motion of a Rigid Object from Two Weak Perspective Views,Computer Vision, Graphics and Image Processing, Dec. 1990, v. 52, n. 3, pp. 309–327.

Siber et al, Claiming Computer Related Inventions As Articles of Manufacture, IDEA vol. 35 No. 1, 1994.

Dickenson, Interactive Analysis of the Topology of 4D Vector Fields, IBM Jrl of Research and Development, Jan.–Mar. 1991, pp. 59–66.

Juyana et al, Motion and Structure From Point Correspondences, $9^{th}$ Intl Conference on Pattern Recognition, Nov.14, 1988, pp. 247–251.

Tian et al, Comparison of Eigenvector–Based Pattern Recognition Algorithms, $9^{th}$ Intl Conference on Pattern Recognition, Nov. 14, 1988, pp. 547–549.

Negahdaripour et al, Robust Recovers of Motion, Proceedings of CVPR '88, 1988, pp. 404–410.

Proceedings Third International Conference on Computer Vision, Dec. 1990, Osaka Japan, "An Approach to 3–D Scene Reconstruction from Noisy Binocular Image Sequences Using Information Fusion", L. Hong et al, pp. 658–661.

*IEEE Transactions of Systems, Man and Cybernetics,*vol. 19, No. 6, Nov. 1989, New York, "3–D Object Reconstruction Using Stereo and Motion", E. Grossi et al, pp. 1465–1476.

IMAGE PROCESSING SYSTEM AND METHOD FOR GENERATING DATA REPRESENTING A NUMBER OF POINTS IN A THREE-DIMENSIONAL SPACE FROM A PLURALITY OF TWO-DIMENSIONAL IMAGES OF THE SPACE

This is a continuation, of application Ser. No. 08/030,509, filed Mar. 12, 1993, now abandoned.

BACKGROUND OF THE INVENTION

1. Field of the Invention

The invention relates to image processing and more particularly to the construction of 3-D graphical models from 2-D images.

2. Background

Computer graphics has reached the stage where it is often difficult at first glance to tell computer generated scenes from real ones. While there are many unsolved details remaining, acceptable images of artificial virtual worlds can now be produced and it is mainly a question of improving the performance before a convincing real-time illusion can be achieved. Outside the realm of pure entertainment, the main inhibitor to making use of the technology in practical applications is that of creating the models to inhabit these virtual worlds. Large amounts of effort have to go in creating what appear to the viewer disappointingly simple models. The amount of effort to create realistic and complex models is very high indeed.

In entertainment, apart from effects such as metamorphosing real actors into unreal beings and the reverse, it is not usually necessary to model reality closely in the graphics. By contrast, in practical applications this is usually an essential part of the task. Most industrial design, for example, has to be fitted into a real environment, and the design can only accurately be judged in its natural context.

As an example, consider the possibility of modelling the inside of a large retail store. These are frequently changed around to keep them interesting and to optimize the sales. However, standard computer-aided-design (CAD) packages are not very satisfactory for the purpose. The essence of the problem can be stated thus: "How do you model a rack of coats on CAD system?"

In this example, the model to be handled is structurally complex but consists largely, if not entirely, of objects which already exist. In the case of a store design one might be dealing with large numbers of objects, such as clothes which are very hard to model.

Virtual reality methods are inhibited in many such practical applications by the absence of easy and reliable methods to capture the complex shapes, textures and colors from the real world and to incorporate these into the virtual world along with new or hypothesized objects.

Computer animations in the film world which imitate reality are created patiently with much measurement, calibration and accurate modelling. CAD techniques are used, but on specialist systems. This degree of effort cannot be justified for more everyday applications and hand-building such models is not an attractive option if it can be avoided.

Existing methods of automatic capture can be divided into two broad classes: active methods and passive methods. In active sensing, the system creates and controls a signal (such as a light beam), which is directed at the object and interprets the signal reflected. Passive sensing relies only on existing illumination.

Whilst active sensing methods give good results, the equipment required is generally specialized and expensive. Because the illumination has to be controlled, the environment is restricted as is the range of size of objects which can be captured. Also, the devices do not capture the appearance of the object at the same time as their shape. This has to be added as a separate step.

Passive methods only require images of the object and so do not suffer from these disadvantages. Only a camera and digitizer is necessary to capture the data and a special environment is not needed.

One such passive method is that of Volumetric Intersection. If a series of images of an object is taken against a contrasting background, these can be thresholded to identify the profile of the object in each image. Considering just one of these images, the object must lie somewhere within the volume of the polygonal pyramid which is formed from all the points in space which project within the profile. An approximation to the object volume can be built by intersecting the pyramidal volumes for all the images.

Although this method has been classified as a passive method, it does rely on being able to separate the background and the object in the images and so relies on highly controlled lighting. Further, because of the method of construction, it cannot reproduce objects with concavities.

Another approach is that of constructing depth maps by matching stereo pairs. The problem with this is that depth cannot reliably be determined solely by matching pairs of images as there are many potential matches for each pixel or edge element. Other information, such as support from neighbors and limits on the disparity gradient must be used to restrict the search. Even with these, the results are not very reliable and a significant proportion of the features are incorrectly matched.

Another problem with automated capture is that of finding a suitable way of storing and manipulating the 3D captured data. Conventional computer graphics relies on texture mapping to obtain a realistic amount of visual complexity. Geometric models would be too large and inefficient a method for describing a complete scene in detail. Geometry is usually used only for the basic shapes, images being mapped onto the surfaces to add the necessary small variations in color and orientation.

Almost universally in computer graphics, geometry is described by a collection of polygonal faces, often with colors associated with the vertices. While this is a convenient canonical form for computer generated graphics, when capturing data from the real world it is not ideal. Natural objects are not often simply described in polygonal terms. Moreover, man-made objects with regular shapes are usually decorated in complex ways to disguise their simplicity. In a manually entered design the basic shape and the superficial texture can be separated, but in automated capture this is more difficult to do. Even with objects generated by CAD systems, one can question the wisdom of reducing all the shape data to hundreds of thousands of polygons when the majority will occupy less than a pixel on the screen, even if they appear at all.

SUMMARY OF THE INVENTION

According to the present invention there is provided an image processing method for generating data representing the appearance of a number of points in a 3-D region from two or more 2-D images of the region, the method comprising the steps of:

a) calculating, for each point, at least one variance value representing the variation between different ones of the 2-D images in the region of the position on the 2-D images at which the point would appear if it were visible in the images;

b) calculating, for each point and using a predetermined rule, a merit value from the variance values, the merit value representing the probability that, if the point lay on a visible surface in the 3-D region, the calculated variance values would be obtained; and c) assigning appearance data to each point in accordance with the merit values and the appearances of the positions on the 2-D images where the point would appear if it were visible thereon.

The invention enables a model to be generated which gives the smallest difference from a set of images when rendered from the camera positions from which these images were taken. Although this does not necessarily produce the most likely or the most accurate model of an object in any physical sense, the advantage of taking this view of the aim of the reconstruction is that it provides a method which can be used without knowing what the original object was. If the reconstruction reproduces the original pictures accurately, then it is at least likely to reproduce views from nearby viewpoints with similar accuracy.

The invention is based on the observation that in computer graphics, absolute accuracy is not, of itself, important: if one cannot tell from a picture of the object exactly where a particular part of a surface is, then by definition, it cannot matter exactly where it is placed in the model. This is in contrast with robot vision (and indeed human vision) where it may be important to avoid colliding with a surface even though it may be quite difficult to tell where it is. Also in computer graphics, although it may be useful, structural information is not necessary. It may be vital to correctly identify features such as corners, edges and faces and their relationship if an object is to be correctly recognized in a database, but this information is not necessary just to recreate an image of it. The requirements for a graphics model are, in some ways, less demanding than for these other applications. In other respects the demands are greater, since the reconstructed object must also look correct.

The step of calculating the variance values can comprise calculating a difference value for each of the 2-D images, the difference value representing the difference between the 2-D image and others of the 2-D images in said region and the step of calculating the merit values can comprise calculating for each 2-D image a merit value, the merit value representing the probability that, if the point lay on a surface visible in the 2-D image, the calculated difference values would be obtained, the merit value for the point being calculated by summing the merit values for all the 2-D images.

In a preferred form of the invention the method comprises the step, between steps b and c, of identifying extreme in the merit values. In this case, the appearance data are assigned assuming points corresponding to identified extreme to lie on visible surfaces. This significantly improves the performance of the method in the case where the 3-D region is known to contain an object or objects having well-defined surfaces.

Various other preferred features of the invention are set out in the attached dependent claims.

Viewed from a second aspect, the invention provides image processing apparatus arranged to perform the above method. The apparatus can include image capture means for capturing the 2-D images and means for storing the 2-D images and the generated model data.

BRIEF DESCRIPTION OF THE DRAWING

An embodiment of the invention will now be described, by way of example only, with reference to the accompanying drawing, wherein.

DESCRIPTION OF THE PREFERRED EMBODIMENT

In the embodiment of the invention the reconstructed objects or scenes are defined as three dimensional fields. These describe the arrangement of matter in space by giving its visual properties at every point. Although the fields are defined throughout space, for solid objects they will mostly either be empty, outside the object, or have an unknown value, inside the object. Only on the object surfaces are the values of interest.

The meaning of the model is defined by the rendering algorithm, which gives the image which would be generated from any camera position. In the embodiment, the model is rendered by ray-tracing. A computationally faster method, such as processing from back to front using the painter's algorithm could be used, but the advantage of ray-tracing is that it has a simple formulation and extends easily to more complex situations.

The following section defines the model to be constructed. The algorithm is then described together with some details of its implementation.

GRAPHIC MODEL

The most general form of three dimensional graphics field is called a texel model. A texel has the following components:

1. A density field. This measures the probability that a ray of light will encounter a surface at each point in space.

2. A lighting model field. This specifies how light falling on each point in space will be modified in color, how it will be reflected and so on.

3. A direction field. This gives the principal directions for each point in space, containing a typical surface normal in the vicinity.

To cope with all aspects of the appearance of real objects all these elements are needed. However, in this embodiment a simplified view has been taken.

Semi-transparent objects are not allowed. All points in space are either completely transparent or totally opaque.

All surfaces are assumed to have the same lighting model, and to be Lambertian reflectors. Light falling on the surface is assumed to be diffused uniformly in all directions, and so be independent of the direction from which the surface is seen. The lighting only consists of direction-less ambient light. Since neither the illumination nor the lighting model depends on direction, the orientation of surfaces in space is unimportant.

By making these simplifications the model of the scene is reduced to two fields:

1. A binary field $S(\underline{x})$, which takes the value 1 if the point $\underline{x}$ (x,y,z) is solid and 0 if it is empty.

2. A field $C(\underline{x})$, which specifies the color of light diffused from each point $\underline{x}$. The value of this field is not relevant if the point is empty.

In this embodiment, a definition of these two fields constitute the appearance data to be generated.

Figure 1:
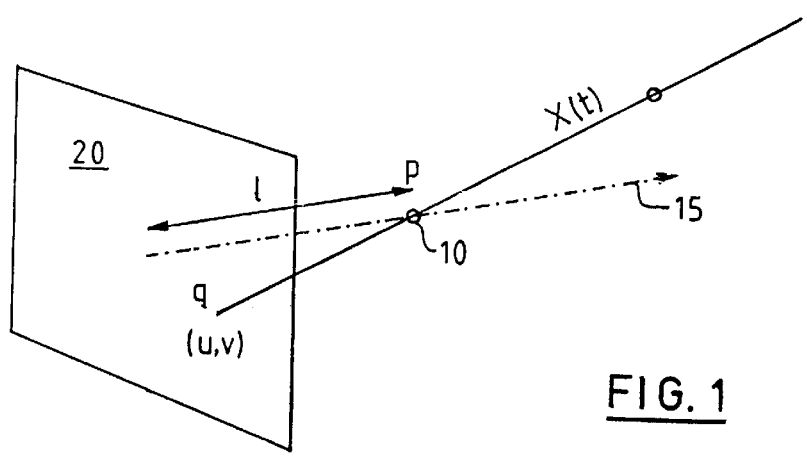
FIG. 1 illustrates the Camera Geometry used in the rendering algorithm.

The formulation for ray-tracing field models is as follows:

Suppose, as shown in FIG. 1, p is the (x,y,z) position in space of the pin-hole (or focus) 10 of the camera to be used to view the model;

R is the rotation matrix giving the camera direction, that is the camera axis 15 and rotation about this axis;

q is the position, relative to the camera, of the pixel of interest. That is, if: (u,v) is its coordinate on the image plane 20 and 1 is the distance of the image plane behind the pinhole position, then:

$$q=(u,v,-l)$$

The ray x(t) which passes through both the pin-hole and the pixel (u,v), is the line:

$$x(t)=p-(qR)t \quad [1]$$

As t is varied upward from zero, the ray passes through all points in space which map onto the point in the camera image. The image plane in this representation lies at t=−1.

The color C of the pixel at (u,v) on the camera image after rendering is given by the limit, as k tends to infinity, of:

$$V(t) = \exp\left\{-k \int_0^t S(x(s))ds\right\} \quad [2]$$

$$C = k \int_0^\infty V(t)S(x(t))C(x(t))dt.$$

Here v(t) gives the visibility of a point at depth t from pixel (u,v). It is determined in the first expression by multiplying the densities along the ray from the camera focus. If S is entirely zero between 0 and t, V(t) is 1. However, should S become non-zero somewhere in this range, the integral will have a positive value and, assuming k is large enough, V(t) will take a small value. As k becomes larger, V(t) will tend to zero. Thus V(t) will have the value 1 for all values of t along the ray until a non zero value of S is encountered. Thereafter, it will have a value approaching zero.

The second expression calculates the color C of pixel (u,v) by adding contributions from points which are visible and which also have non-zero density. These will be concentrated about the point where S(x(t)) first becomes non-zero. As k approaches infinity, the contributions are clustered more and more closely round this point.

METHOD

Equations [2] determine the color of any pixel given the fields S(x) and C(x). It is required to invert the equations to determine fields S and C given values of the color of a large number of pixels from various camera positions.

Even with simplifying assumptions which have been made, this problem is still very hard to solve directly. To invert the second set of equations to obtain the density field, values for the visibility at each point are required, but this turn depends very non-linearly on the density to be calculated. Any solution would have to be iterative. Further, most objects are completely opaque to light, so that S tends to take one of the extreme values. This means the value of the field S(x) at most points cannot be determined at all since if a point is not empty, it will almost certainly be beneath the surface of an object and so be hidden from all viewpoints. The characteristic makes the computation very unstable.

Consequently, the method of the present invention does not attempt to iteratively converge on the ideal solution. Instead, a plausible approximation is produced based on a single pass through the image sequence.

The rationale behind the method of the invention can be explained as follows.

Figure 2:
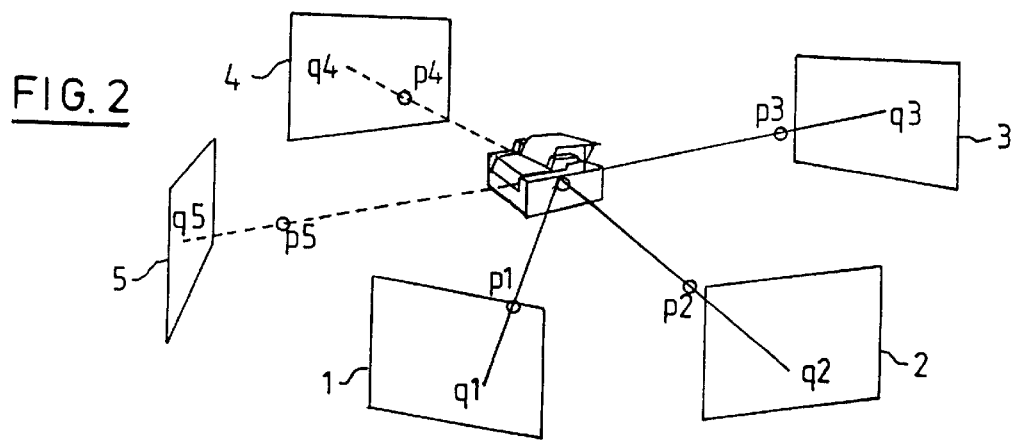
FIG. 2 illustrates a notional multiple camera geometry.

Although in most practical embodiments the images are expected to be taken as a series of frames on a single camera one after the other, it is more convenient for description to think of them as being recorded by a multiplicity of cameras all present at the same time. Consider, therefore, an object suspended in space and surrounded by a number of cameras, as illustrated in FIG. 2.

Suppose one were positioned on the surface of the object, on a small patch with, say, a green texture. For simplicity, the cameras are all imagined to be of the pinhole variety. If one looked toward the pinhole $p_1$ of the first camera 1 and through it, one should be able to see a pinhole-sized portion of the film at $q_1$ which is exposed to this surface patch on which one is standing. It will record green, corresponding to the green photons which followed the line of sight from the patch and impinged on the films surface. Similarly the second camera 2 will have recorded a similar green texture at the point $q_2$ where the rays of photons through its pinhole from the surface struck the film. This will apply to all cameras whose pinholes are visible from the particular surface patch.

Some camera pinholes, for example $p_4$ and $p_5$ will not be visible from this position. Suppose now we remain suspended in exactly the same place, but remove the object so that these other cameras become visible. Observing the colors recorded on the film where rays through the pinhole met the film of these cameras, we will see a variety of colors and textures. These came from different parts of the object, all of which were hidden from view. There will be little consistency between them. The values recorded will thus divide into two sets. One set will have recorded a relatively consistent set of values, corresponding to cameras from which the surface point was visible, and one set will have recorded a variety of colors and textures.

Figure 3:
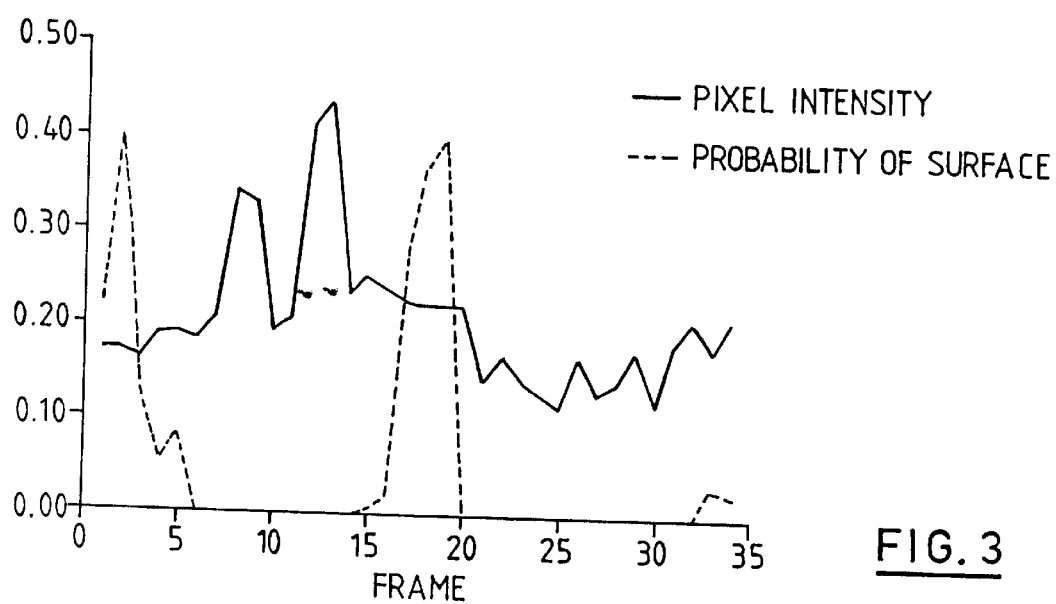
FIG. 3 shows the value of the pixel intensity in a sequence of images when viewed from a fixed location in space.

FIG. 3 shows the pixel intensities from an image sequence which correspond to a particular point on a surface. The consistent region, where the cameras are recording data from the surface, is in the center, in the region around frames 15 to 20. At other frames the surface is not visible.

If we now consider being positioned at a point away from any surface and again look through the camera pinholes we will not find consistency in the recorded color. But the closer to a surface we are, the more consistency we expect to see. So, if we are positioned somewhere above the surface, all the cameras will appear to record inconsistent data. Moving towards it, some of the cameras (the visible ones) will begin to record more consistent data, the consistency passing a maximum at the surface before decreasing again. We can deduce that the surface is at this point of maximum consistency. However, it is only a subset of the cameras, the visible ones, which agree. The invisible ones will continue to give a variety of colors and intensities even at the correct surface point. The problem is to find the position of the surface, as the position of maximum consistency in the recorded data, but without knowing which cameras are visible from the surface and which are not.

The first requirement therefore is to estimate the likelihood that there is a surface near each point, visible from the position of a camera. The method used in this embodiment is to note the variance in color space of image patches over successive frames and to compare this with what one might expect if a surface were present. The estimate using this method is shown as a dotted line in FIG. 3. Note that while a high likelihood means that there probably is a surface near the point, a small value does not necessarily mean that there is no surface there. It can either mean that there is no surface there or that if a surface is present, it is not visible.

Given this probability estimate or merit value for each point in space and for each frame, the next step is to combine the probabilities and pixel colors to give a total estimate for the required fields.

For the color, the ideal we would like to approach is that a point on a surface is colored so as to minimize the mean square difference between it and the colors recorded by the cameras in which it is visible. If the point is eventually chosen as a surface point, it is reasonable to assume that the calculated probability value for a frame actually represents that the point is visible in that frame. The combined color of the point should therefore be the average of the pixel colors recorded, weighted by the calculated probabilities. By similar reasoning, the probability of a surface at each point can be estimated by averaging the probabilities, weighting each in the same way.

The effect of the algorithm is that the calculated likelihood represents the probability of a ray encountering a surface in the region. It is assumed that some rays pass through each point and some rays do not, the proportion being controlled by the probability value. It is as if the region surrounding the point was transparent in parts. For instance, as it might be if it contained foliage or a cloud of water droplets. In contrast, if the original picture was of an object with well defined surfaces and edges it is desirable to identify surfaces. However, in doing this, it should be recognized that objects with very indefinite surfaces such as clouds or trees will not be correctly treated. To find the surfaces, points are chosen where the probability of there being a surface is at a local maximum, and all others are eliminated. Finally, surfaces which are either insufficiently likely, or for which there is insufficient weight of evidence are removed.

The steps in the method are discussed in more detail in the next sections.

MATCHING

To find the relative likelihood of a point being on a surface, the position at which the point would appear, were it visible, is determined for a number of images and patches of the images surrounding these points are compared. The less the variation, the higher the probability of a surface.

Given a point $\underline{x}$ in space, the position at which it should appear in the image of a particular camera is given by inverting equation [1]. If $\underline{p}$ and R are the position and rotation of the camera in frame f, the image position $(u_f, v_f)$ is found from:

$$(u_f, v_f - 1) = -\frac{1}{t}(\underline{x} - \underline{p})R^{-1} \qquad [3]$$

The third component being used to determine the value of t, $P_{ijk}$ is used to mean color component k of pixel (i,j) in image patch P.

So if:

$I_k(u,v)$ is component k of the color at position (u,v) in the place of image I recorded on a particular camera;

$(u_f, v_f)$ is the center point of the patch on the image; and a and b are the distances separating pixels in the u and v directions respectively on the image, then:

$$P_{ijk}=I_k(u_f+ia, v_f+jb).$$

In this embodiment, each pixel has three color components. It is convenient if they all contribute equally to the measure of similarity. Comparison is done with a set of components which are approximately perceptually equal. They are derived from the standard red, green and blue intensities as follows:

$U'=0.2698\times red+0.299\times green-0.003\times blue$ $V'=0.0773\times red+0.587\times green+0.355\times blue$ $W'=0.0889\times red+0.114\times green+0.380\times blue$ The rationale for using this metric which is based on equal steps in human perception is that the human visual system may possibly have been optimized to maximize the discrimination between objects.

In this embodiment a series of images in 10 degree steps are captured. For any two neighboring images, the point of interest $\underline{x}$ is projected onto the image planes of the cameras, f and f+1, and two patches $P_{ijk}$ and $Q_{ijk}$ are derived. Then the $$s = \sum_{k}\sum_{i,j}(P_{ijk} - Q_{ijk})^2 / \sigma_{i,j}^2$$

is computed where the sum over k is over the color components and the sum over i and j is over the patch. For a greater number of images, this generalizes to the sum of the variances of each color component and pixel position in the patch.

The factors $\sigma^2_{ij}$ are intended to weight the individual pixel comparisons appropriately. In particular, comparisons in areas of high intensity gradient are subject to greater error because, in order to find the intensity at a point, the intensity at the nearest pixel is taken. This is likely to be more in error when the difference between adjacent pixels is high. Thus, the variance of a pixel (ij) is modelled as:

$$\sigma^2_{ij}=\sigma^2_c+v^2_{ij}$$

where: $\sigma^2_c$ is a variance common to all pixels resulting from quantization errors, anisotropic radiation, the surface not being parallel to the image plane, and so on, and $v^2_{ij}$ is the variance in the intensity of the four pixels surrounding point (i,j) in patch P.

If the point $\underline{x}$ under consideration is on a surface, which is visible in the two images, then the patches on the two images should be identical except for the various sources of error. If these are modelled by assuming each pixel has Gaussian noise added with zero mean and the variance $\sigma^2_{ij}$, then s, being a sum of squares, will have a chi-squared distribution of values. If there are n pixels in the patch and n is large enough, we can approximate this by a Gaussian distribution whose mean is 6n and whose variance is 12n.

Therefore, if two patches are compared and a value s is obtained, the probability density that these derive from an identical surface element is proportional to the Gaussian function:

$$S_f(\underline{x}) = \frac{1}{\sqrt{(24\pi n)}} \exp-\left\{\frac{(s-6n)^2}{12n}\right\}$$

For example, in FIG. 3 the visible surface in the vicinity of frame 18 is correctly identified, but the point in space is also assessed as being visible near frame 2. This is not correct, but comes from correlations originating at the opposite side of the object.

Given a series of values $S_f(\underline{x})$ for a number of frame pairs, these are combined to give values for the required fields as follows.

The total weight of evidence for the existence of a surface at a point is obtained by summing the individual probabilities over all frames:

$$W(\underline{x}) = \sum_f S_f(\underline{x})$$

The position where the ray from $\underline{x}$ strikes the image plane of frame f is calculated by Equation [3]. If the color recorded is denoted $C_f(\underline{x})$, then the color assigned to surface element is the weighted average:

$$C(\underline{x}) = \frac{\sum_f S_f(\underline{x}) C_f(\underline{x})}{W(\underline{x})}.$$

Similarly, a merit value representing the average probability of a visible surface at point ($\underline{x}$) is estimated from:

$$S(\underline{x}) = \frac{\sum_f S_f(\underline{x}) S_f(\underline{x})}{W(\underline{x})}.$$

In the case where the object is known to have well defined surfaces, it is assumed that surfaces are located at positions where the probability values are maximized. These are set to 1, field values at other points are set to zero.

Three methods for finding suitable surfaces by identifying extreme in the data have been considered:

1. three-dimensional ridge finding
2. maximum along the viewing direction
3. finding zero crossings of the divergence of the viewing direction vector field.

The first of these is, in principle, preferable because it relies only on the probability field $S(\underline{x})$, but the second method has been found to be more convenient to use in practice.

Consider first how to recognize a ridge on two dimensional terrain. If one is positioned on such a ridge and looks along it, the surface will fall away relatively steeply on either side. The slope on the left is positive and on the right it is negative. The curvature across the ridge is thus high and negative. At the top, the surface is level left to right and so the slope is zero in that direction. Along the ridge, the surface may run level or may slope up or down, but the change of slope is relatively low. To find a ridge, therefore, the directions along which the curvature takes it greatest or least value are found. If the curvature along either of these directions is negative, then the point is designated as a ridge point if the slope is zero along that direction.

In three dimensions, suppose S is the value at the point, grad S is the slope at the point, $l_1$, $l_2$ and $l_3$ are the eigenvalues of the curvature, with corresponding eigenvectors $\underline{w}_1$, $\underline{w}_2$ and $\underline{w}_3$. A point is a ridge point if, for some i:

grad $S \cdot \underline{w}_i = 0$ and $l_i < 0$ assuming grad $S \neq 0$.

To find the ridges by this method, the curvature eigenvectors are found at each point. The dot product of each with the slope is then found, to give three three-dimensional scalar fields, corresponding to the first term in this expression. The zero crossings in these fields are then found. As they are represented as three dimensional grids of the points, each set of adjacent values is examined. Any box having both positive and non-positive values in one of the fields contains a possible ridge. Boxes are marked as ridges if the corresponding eigenvalue is negative.

A more stable computation results if the value is maximized, not along a direction of extremized curvature, but along the average viewing direction.

The average viewing direction of visible cameras is calculated at each point as follows:

$$\underline{D}(\underline{x}) = \sum_f S_f(\underline{x}) \underline{D}_f(\underline{x}),$$

where $\underline{D}_f(\underline{x})$ is the direction of camera f from position $\underline{x}$.

If the surface is viewed from a uniform spread of directions around the surface normal then this approximates the normal. If the spread is not even, the direction will not be accurately along the normal but should at least point away from the surface. Also, matching becomes less good as the surface is angled further from the viewing direction and this weights the average in favor of directions which lie approximately along the normal.

Points where S is a maximum along this direction are designated as being on a surface. These satisfy:

(grad S)·$\underline{D}$=0

Those which also have negative curvature at the point in the direction of $\underline{D}$ are the required maxima. In the its eigenvectors, and only its sign is used to accept or reject the resulting maxima. A three-dimensional version of the Sobell operator is used to find the slope of f, and simple differencing of slopes appears adequate to find the sign of the curvature.

The third method involves finding zero crossings of the divergence of the viewing direction vector field. The input is a vector field $\underline{D}(\underline{x})$, which is the average of the directions from which each point in space was observed, weighted by the probability of observing a surface at that point.

The divergence of such a vector field measures the net flux into or out of the region surrounding each point. The surfaces in the field are considered to be located at positions where the divergence vanishes. As in other cases, it is necessary to inspect the direction of curvature to distinguish positive "surfaces" from negative ones.

The divergence is easy and quick to compute by subtracting adjacent grid values and has been found to work as well as the other two methods.

IMPLEMENTATION

In this embodiment of the invention the 2-D images are captured using a still-video camera mounted on a tripod. The object is placed on a rotatable turntable and pictures taken at 10° intervals. The lighting is kept reasonably uniform by pointing the main light-source at the ceiling. A white background is used. The camera to object distance is 300 mm. A wide angled lens is used, the 35 mm camera equivalent of its focal length being 40 mm.

This arrangement is used because it is much easier to move the object in a controlled way than to move the camera. However, it does not correspond to the situation understood by the method which expects the object to be stationary and the camera to move. The only difference in the pictures obtained from the actual set-up and that expected is in the background. If it is assumed that the pictures are taken from a moving camera, the conclusion has to be drawn that background, which remains stationary in the frame, is also moving.

The background, which can be recognized because it is very bright, is made completely featureless by setting all pixels of high enough intensity to a standard (zero) value. The algorithm is then prevented from determining the background position simply by returning the surface probability as a very low value whenever two completely uniform patches are compared.

The pictures are digitized from the PAL output of the camera using an IBM Audio Visual Connection card on an IBM PS/2 personal computer. Processing is carried out on an IBM ES/3090 mainframe computer (IBM, Audio Visual Connection, PS/2 and ES/3090 are trademarks of International Business Machines Corporation). The fields are stored as uniformly sampled arrays, each 100 by 100 by 100 values covering the region surrounding the object. This size keeps processing times to a reasonable length while giving adequate resolution in the output. It will be understood that as the resolution increases, the field size increases dramatically and other storage methods could be used, making use of the fact that all the interesting data is very localized in the regions near the surfaces.

Other parameters of the method in the embodiment of the invention are as follows:

Image size: 128 by 128, 3 color components patch size: 5 by 5 pixel variance: 64, corresponding to the (square of) the typical smallest differences in output from the digitizer.

threshold: 10% of maximum weight

There has been described a method of constructing graphic models using image matching.

Although a simple differencing matching method has been used in the embodiment of the invention, it will be understood that other types of variance values, such as correlation values between corresponding points in the 2-D images, could be used to represent the variation between the images. Also, as the correct estimation of surface probability is central to the accuracy of the method, it will be understood that performance could be improved by using a more sophisticated probability estimation method.

Also, some of the simplifying assumptions which are made in this embodiment could be lifted. For example, a more realistic surface model, allowing for specular reflection, could be incorporated. Thereafter, the algorithm could be integrated with a method for determining camera motion, to create a complete 3D capture system.

What is claimed is:

1. A method for generating a model of a 3-D region of an object comprising image data representing a plurality of points in the 3-D region from at least three 2-D images of the appearance of the region from different positions, comprising the steps of:
    (a) calculating, for each point in the 3-D region, at least one first value representing a variation between image data at locations on the at least three different 2-D images of the 3-D region at which each point would appear if the point in the 3-D region were visible in the 2-D image;
    b) calculating, for each point, using a predetermined rule, a second value from said first value, said second value representing a probability that if each point lay on a visible surface in the 3-D region, the first value would result;
    (c) assigning a visibility attribute to each point in accordance with said second value and visible characteristics of said locations;
    (d) determining from the visibility attribute of each point from step (c), whether each point in the 3-D region is on the surface of the object; and
    (e) using those points from step (d) which have been identified to be on the surface of the object to build a model of the 3-D region for viewing images of the region from multiple positions.

2. A method according to claim 1 wherein said step of calculating a first value further comprises the steps of calculating a difference value for each of said 2-D images, said difference value representing a difference between a selected one of said 2-D images and others of said 2-D images in said region; and
    wherein said step of calculating a second value further comprises the step of calculating for each of 2-D image a merit value, said merit value representing a probability that if a point lay on a surface visible in said selected one of said 2-D images, said calculated difference value would result.

3. A method according to claim 2 wherein a method value for a selected point is found by summing merit values for corresponding points in each of said 2-D images.

4. A method according to claim 3 wherein a method value for a selected point is found by summing merit values for corresponding points in each of said 2-D images.

5. A method according to claim 2 further comprising the step of identifying extrema in said second values wherein said visibility attributes are assigned in accordance with three determined conditions of visibility.

6. A method according to claim 5 wherein said visibility data comprises a first part indicating whether said point lies on a visible surface and a second part indicating a color of said visible surface at said point; and
    wherein said step of assigning said visibility attributes comprises calculating a color value for each point which lies on a visible surface.

7. A method according to claim 1 wherein a region in each of said 2-D images over which said first values are calculated includes a plurality of picture elements.

8. A method according to claim 1 further comprising the step of identifying extrema in said second values wherein said visibility attributes are assigned in accordance with three determined conditions of visibility.

9. A method according to claim 8 wherein said visibility attributes comprise a first part indicating whether said point lies on a visible surface and a second part indicating a color of said visible surface at said point; and
    wherein said step of assigning said visibility attributes comprises calculating a color value for each point which lies on a visible surface.

10. A method according to claim 9 wherein said extrema in said merit values are identified using a three-dimensional ridge finding method.

11. An image processing apparatus for generating a model of a 3-D region of an object comprising image data representing an appearance of a plurality of points in said 3-D region from at least three 2-D images of the appearance of said region from different positions, comprising:
    means for calculating for each point in said 3-D region at least one first value representing a variation between image data at locations on said at least three 2-D images of said 3-D region at which said each point would appear if said point in said 3-D region were visible in said 2D image;
    means for calculating for each said point, using a predetermined rule, a second value from said first value, said second value representing a probability that if said each point lay on a visible surface in said 3-D region, said first value would result;

assigning means for assigning one or more visibility attributes to each said point in accordance with said second value and visibility characteristics of said locations;

determining means for determining from said visibility attribute of each point, whether each point in said 3-D region is on the surface of the object; and means for using those points from determination means which have been identified to be on the surface of the object to build a model of said 3-D region for viewing images of said region from multiple positions.

12. Apparatus according to claim 11, further comprising:

means for capturing 2-D images; and means for storing said 2-D images.

13. Apparatus according to claim 12 wherein said means for calculating at least one first value comprises means for calculating a difference value for each of said 2-D images, said difference value representing a difference between a selected one of said 2-D images and others of said plurality of 2-D images in said region; and said means for calculating said second value further comprises means for calculating for each of said plurality of 2-D images a merit value, said merit value representing a probability that if said point lay on a surface visible in said 2-D image, said calculated difference value would be obtained.

14. Apparatus according to claim 13 further comprising means for summing said merit values for corresponding points on all of said plurality of 2-D images.

15. Apparatus according to claim 14 wherein said region in said 2-D image over which said first value is calculated extends over a plurality of picture elements.

16. Apparatus according to claim 15 further comprising means for identifying extrema in said merit values when said visibility attributes are assigned.

17. Apparatus according to claim 16 wherein visibility attributes for each of said points comprise a first part indicating if said point lies on a visible surface and a second part indicating a color of said visible surface at said point, and wherein said means for assigning said visibility attributes comprises means for calculating a color value for each point which lies on a visible surface.

18. Apparatus according to claim 17 wherein said means for identifying said extrema further comprises means for locating zero crossings in a convergence of a vector field representing for, each said point, an average viewing direction multiplied by a factor proportional to said probability.

19. Apparatus according to claim 18 wherein said means for identifying extrema comprises a three-dimensional ridge finding means.

* * * * *